3,512,060
MACHINE TOOL CONTROL SYSTEM
George W. Floyd, Palos Verdes Peninsula, Calif., assignor to Ex-Cell-O Corporation, Detroit, Mich., a corporation of Michigan
Filed July 18, 1967, Ser. No. 654,200
Int. Cl. G05b 19/20, 19/32
U.S. Cl. 318—18      20 Claims

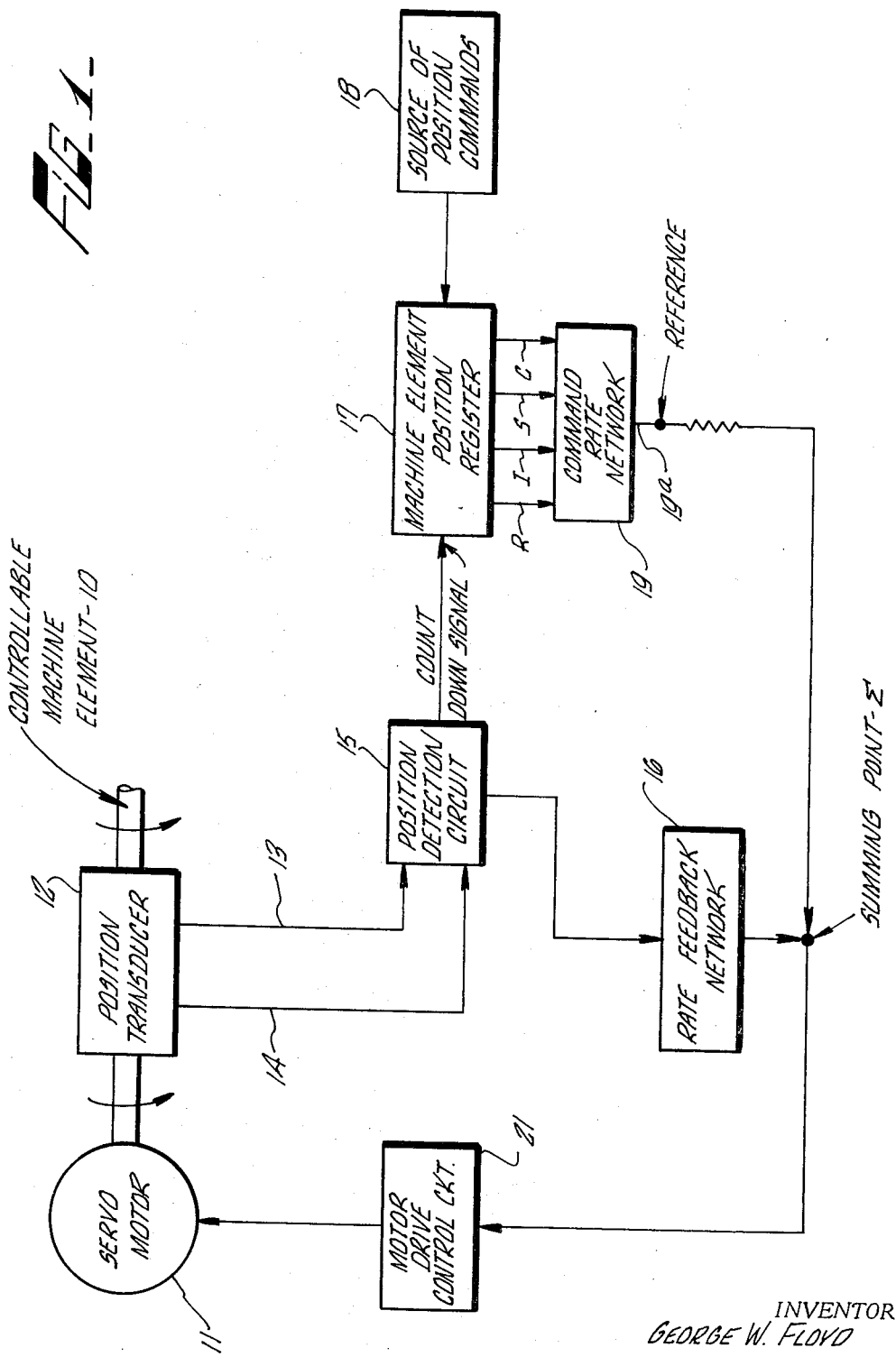

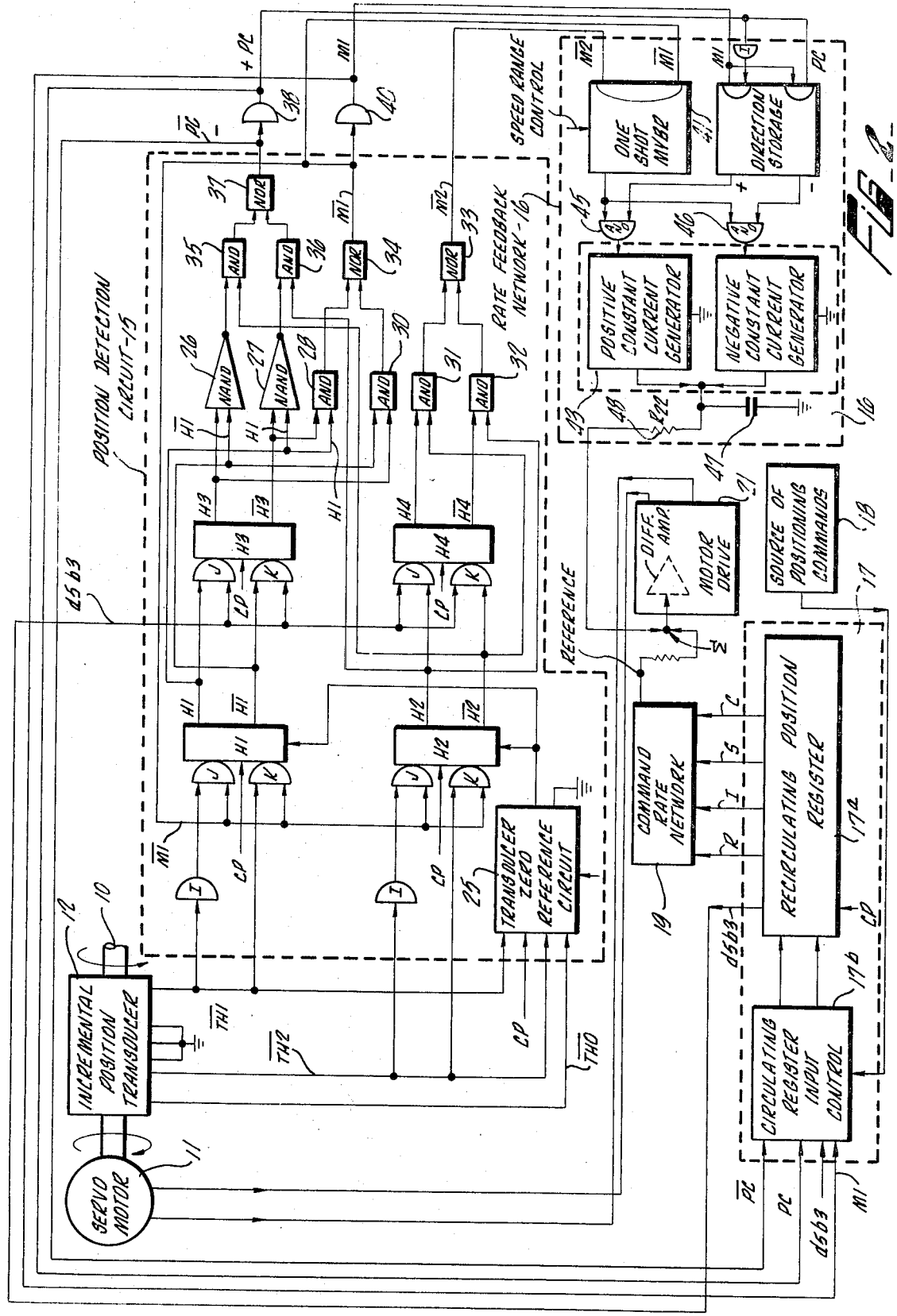

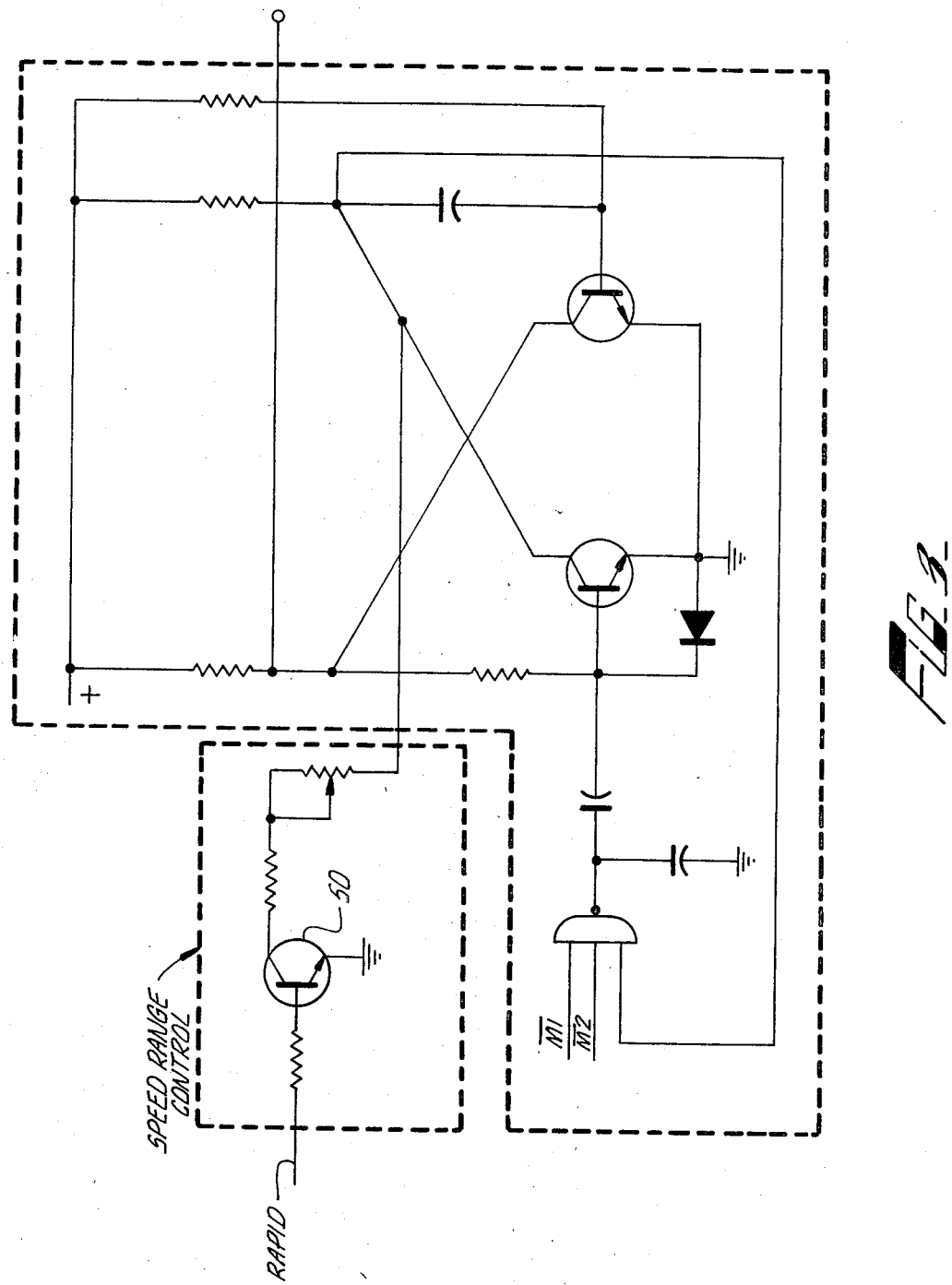

ABSTRACT OF THE DISCLOSURE

An automatic control system for a machine tool in which a single position transducer is employed to provide the necessary signals for monitoring both the position and the rate of travel of the controlled machine element. Position detection circuit means provide signals in response to the position transducer signals to program the controlled machine tool element for a rate of travel in accordance with its actual position. The transducer signals are also employed to generate signals representative of the actual rate of travel of the controlled machine element. These signals are combined to cause the machine element to travel at the programmed rate in accordance with its position.

---

This invention relates to a machine tool control system and more particularly to an improved control system for automatically positioning a movable element of a machine tool or the like.

Control systems for automatically positioning machine tool elements, both analog and digital control systems, are well known to the art. One such prior art digital control system is exemplified by the disclosure in U.S. Patent 3,237,486 granted on Mar. 1, 1966. These systems are employed to position a machine element in accordance with a numerical command applied to the control system. For the purposes of accurately positioning a machine element, the system must be capable of not only controllably moving an element to a desired position but also must be able to monitor and control the rate of travel toward the desired position. Accordingly, the machine tool control system for automatic positioning must have the capability to monitor both the actual position relative to the desired position and the rate of travel of the machine element towards the desired position to assure that the controlled element is stopped at the correct point without undershooing or overshooting the desired position. These prior art systems generally employ a position transducer that provides signals for monitoring the actual position of the machine tool as it travels towards the desired position and yet another element, such as a tachometer, for example, for signalling the actual rate of travel of the controlled element towards the desired position. Such a digital control system is represented by the aforementioned U.S. patent. It is also known in the art to provide the rate of travel feedback signal by means of a position transducer other than the position transducer employed for monitoring the actual position of the controlled element. Other prior art techniques for providing the rate of travel feedback signal involve sensing the control motor back electromotive force (EMF). This method limits the range of the motor rate of travel and the rate control accuracy due to the limitations in the ability to sense back EMF and the accuracy of the back EMF as a function of speed. The use of a tachometer for these purposes provides accurate rate control over a wide speed range but is costly due to the cost of the tachometer and the associated mechanical gearing and coupling to the motor.

The present invention provides an improved automatic control system for a machine tool or the like in which a single position transducer is employed to provide the necessary signals for monitoring both the position and the rate of travel of the controlled machine element. The use of a single element for these dual functions reduces the over-all cost of the machine tool control system and affords the advantages of a tachometer system for monitoring rate of travel. Furthermore the present invention provides a simple inexpensive arrangement of changing the entire speed range not possible with a tachometer feedback system and without resorting to elaborate switching or mechanical coupling changes.

From a structural standpoint, the present invention provides an improved control circuit for use in an automatic machine tool system wherein a motor is coupled to drive a controllable machine tool element along with a position transducer to be driven in unison with the machine tool element and provide signals for each increment of travel of the machine tool element. The signals from the position transducer are handled by position detection circuit means for providing digital count signals and direction of travel signals therefrom. The digital signals thus provided are applied to a rate of travel feedback network which includes constant current generating means for developing an analog signal representative of the actual rate of travel of the controlled machine tool element. The same position signals are applied to a position register for signalling and registering the increment of movement of the machine tool element. The position register may be initially provided with a numerical command representative of the desired position to which the machine element is to be moved and the application of the position signals thereto is effective for defining an output signal from the register indicative of the change of position of the machine tool element. The output signals from the position register are applied to a rate network or a digital to analog converter for commanding the motor to provide a desired rate of travel to the machine tool element. This rate of travel signal will differ in accordance with the relative position of the machine tool element to its desired position and is applied to a motor control circuit in combination with the rate of travel feedback to effect the desired rate of travel.

These and other features of the present invention may be more fully appreciated when considered in the light of the following specification and drawings, in which:

FIG. 1 is a general block diagram of the machine tool control system embodying the present invention;

FIG. 2 is a block-schematic diagram of the machine tool control system of FIG. 1; and FIG. 3 is a schematic circuit diagram of a controllable multivibrator employed in the circuits of FIGS. 1 and 2.

It should be understood at the outset that the positioning control arrangement that is the subject of this invention is applicable to any machine tool or mechanical arrangement wherein the adjustment of one member relative to another is desired. For the purposes of facilitating the understanding of the present invention, however, the invention will be discussed as it may be applied to any conventional machine tool and for this purpose the element to be positioned is merely illustrated as a rotatable shaft and identified as a controllable machine element. It will also be understood that the usual control arrangement for a machine tool may be either an analog or digital control and that the controllable machine element may be positioned in at least three degrees of translational freedom and which three degrees are often referred to as the longitudinal, or X; cross, or Y; and vertical or Z axes.

Now referring to FIG. 1, the organization of the invention as applied to a controllable machine element will be examined. The controllable machine element 10 is illustrated as a rotatable shaft driven by a conventional servo motor 11. To signal the incremental changes in the machine element, a position transducer 12 is illustrated mounted on the controllable element 10 to be driven in unison therewith. Accordingly, the position transducer 12 may be a conventional incremental position transducer providing output signals in response to each preselected increment of motion of the machine element 10. In accordance with the concept of the present invention, the signals from the position transducer 12 appearing on the output lead wires 13 and 14 for the transducer are applied to circuit means for generating signals representative of the actual position of the machine element 10 and signals indicative of the actual rate of travel of the machine element 10 towards its desired position in response to the energization of the servo motor 11. The position transducer signals on the lead wires 13 and 14 are initially applied to a position detection circuit 15 for defining digital signals for counting purposes and a signal indicative of the direction of travel of the machine element 10 relative to its desired position. These output signals from the position detection circuit 15 are applied to a rate feedback network 16 from which is derived an analog signal representative of the actual rate of travel of the machine element 10. Alternatively, the rate feedback network can be considered as a digital to analog converter.

The signals from the position detection circuit 15 are also applied to a machine element position register 17. The position register 17 is of conventional construction and stores a digital signal representative of the numerical command to which the machine element 10 is to be driven. The numerical command for this purpose may be applied to the machine element position register 17 from a positioning command source 18 and the source 18 may be a series of manually operated digital switches or a paper tape reader having the numerical commands recorded on the paper tape and applied directly from the reader to the register 17. The signal applied to the machine element position register 17 from the position detection circuit 15 may be considered as a count down signal wherein in response to each count signal or a signal representative of an incremental change in the position of the element 10 the register is counted down as the element 10 approaches its desired position or counted up as it moves away from a position. Accordingly, the output signals for the position register 17 under these conditions will reflect the change in position of the machine element 10 and produce digital output indications corresponding thereto. These digital output indications from the position register 17 are utilized in combination with a command rate network 19 for providing an output signal on the lead wire 19a representative of a desired rate of travel for the machine element 10. As is well known in the machine tool control art, the desired rate of travel for a machine element will vary in accordance with the distance that the element is from its desired position so as to avoid overshooting or undershooting the desired position. For this purpose, four different digital output indications are selected from the machine position register to command the element to travel at these different rates of speed. The four output indications from the register 17 are identified as the lead wires R, I, S, and C. These lead wires respectively correspond to a rapid rate of travel which is the greatest rate of travel that is desired when the positioning operation is initiated. The final rate of travel or the slowest is the C position, the creep position, and is initiated at a time when the element is at a predetermined distance from its desired position in a fashion to essentially slide into the desired position without overshooting or undershooting. The next lowest position is the S position, which is identified as the slow position, while the remaining position, or I position, is of an intermediate speed. The I position is intermediate in speed the rapid rate and the slow rate. The slow speed is a speed intermediate the "creep" speed and the "intermediate" speed.

The command rate network 19 is essentially a digital to analog converter and the analog signal derived therefrom is applied in combination with the signal from the rate feedback network 16 to a summing point identified as the point Σ. The summing point functions as an input terminal to a motor drive control circuit, shown in block form as the block 21. The motor drive control circuit 21, in response to the analog signals applied thereto, is effective for controlling the rotation of the servo motor 11 and thereby the rotation or travel of the machine element 10.

It should be recognized from the above generalized description that a single position transducer is employed whereby the output signals provided therefrom are utilized for monitoring the position of the element 10 and the actual rate of travel without requiring additional transducers, tachometers, or other instrumentalities.

With the above generalized organization of the machine tool system of the present invention in mind, the more detailed block-schematic diagram of FIG. 2 may be examined. In this drawing the position transducer 12 is illustrated as an incremental position transducer which may be of any conventional construction and in the specific embodiment of the conventional transducer under consideration provides a pair of phase displaced output signals in response to each increment of motion of the machine element 10. These pairs of phase displaced signals appear on lead wires identified in FIG. 2 as $\overline{TH1}$ and $\overline{TH2}$. This pair of signals is applied directly to the detector circuit 15. In addition the position transducer 12 provides an output signal on the lead wire $\overline{TH0}$. This signal is a zero reference signal and is employed to indicate the starting or reference point of the transducer 12. The lead wire $\overline{TH0}$ is illustrated as being applied to a block, comprising the position detection circuit 15, identified as the transducer zero reference circuit 25. The zero reference circuit 25 essentially comprises a bistable storage element that is triggered from one position to another by the signals appearing on the lead wires $\overline{TH0}$, $\overline{TH1}$, $\overline{TH2}$, along with a clock pulse. The output signal from such a bistable element 25 is applied to the remaining circuits of position detection circuit 15 for initiating the processing of the phased displaced signals $\overline{TH1}$ and $\overline{TH2}$. For processing these phased displaced signals there is provided a group of bistable storage elements, the first group of which is identified as the elements H1 and H2. The logical input circuits for controlling both of these storage elements H1 and H2 comprise individual pairs of AND circuits shown as the J and K AND circuits for controlling the two stable states of the bistable elements H1 and H2. These bistable circuits H1 and H2 are further controlled by means of a clock pulse provided thereto from a suitable clock pulse source (not shown). Associated with each of the J input circuits for the bistable circuits H1 and H2 is an inverter circuit I. For the element H1, the inverter circuit I is coupled between a J input circuit and the lead wire $\overline{TH1}$. In the same fashion the J logical circuit for the bistable circuit H2 is coupled to the lead wire $\overline{TH2}$ and its individual inverter circuit, I. The signal $\overline{TH1}$ is also directly applied as one of the two input signals to the K logical circuit for the element H1. In the same fashion, $\overline{TH2}$ is also applied as one of the two input circuits for the K logical circuit for the element H2. The remaining input signals for the logical elements J and K is a signal identified as $\overline{MI}$. This signal is applied as an input signal for both pairs of J and K circuits for the elements H1 and H2 as illustrated. The $\overline{MI}$ signal is derived from the output of the position detection circuit 15 and is fed back for controlling the elements H1 and H2, the significance of this will become more evident hereinafter.

In addition to the aforementioned signals both of the elements H1 and 82 are coupled to the output of the zero reference circuit 25, as illustrated. It will also be appreciated in accordance with conventional notation that the output signals from the elements H1 and H2 are a complementary pair of signals and are identified as the pair H1 and $\overline{H1}$, and H2 and $\overline{H2}$, respectively. These complementary pairs of output signals are applied to control the successive pair of bistable elements identified as H3 and H4. These are also controlled in the same fashion as the elements H1 and H2 by means of individual AND gates identified as J and K gates. The complementary pair of output signals from the elements H3 and H4 are respectively identified as H3 and $\overline{H3}$ and H4 and $\overline{H4}$. The H1 signal from the element H1 is applied directly to one of the two J input circuits for the element H3, the $\overline{H1}$ signal is applied directly to one of the inputs of the K circuit for the same element H3. In the same fashion the H2 output circuit is applied directly to the circuit for the element H4 and the $\overline{H2}$ circuit to its K input circuit. These signals are entered into bistable elements H3 and H4 under the control of a pulse identified as a pulse $d5b3$ which is coupled as a remaining input signal for both pairs of J and K circuits for the element H3 and H4. The significance of the signal identified as the $d5b3$ signal will be apparent hereinafter in connection with the description of the position register 17. For the present it will be understood that this signal is effective for transferring the state of the elements H1 and H2 to the corresponding elements H3 and H4, respectively.

To process the signals from the elements H3 and H4, a logical network of NAND, AND and NOR circuits are provided from which a count signal indicative of an incremental movement of the element 10 and the direction of movement is provided. Each of the output signals $\overline{M1}$ and $\overline{M2}$ indicate an increment of motion or that a pair of phase displaced signals that have been generated by the transducer 12. The signals identified in the drawing as PC and $\overline{PC}$ identified the signals representative of the direction of motion of the position transducer. The signal PC is considered as a positive count signal, while the signal $\overline{PC}$ is a negative count signal. It should be appreciated that the logical functions of the NAND, AND, and NOR circuits are well known in the art. The first NAND circuit is identified as the NAND circuit 26 and is coupled to receive at its two input circuits, the signal H3 and the signal $\overline{H1}$. Similarly, a second NAND circuit identified as the NAND circuit 27 has one of its two input circuits connected to the H3 signal and its remaining input circuit to the H1 signal. The NAND circuit 28 is connected to be responsive to the pair of signals identified as the $\overline{H3}$ signal and the H1 signal. A logical AND circuit 30 is coupled to receive and be responsive to the input signals H3 and $\overline{H1}$. To process the signals H4 and $\overline{H4}$ from the bistable element H4, AND circuits 31 and 32 are provided. The AND circuit 31 receives the H4 signal in combination with the $\overline{H2}$ signal. The AND circuit 32 receives the $\overline{H4}$ signal and the H2 signal. The output signals from the circuits 31 and 32 are utilized in combination as the input signals to a NOR circuit 33 and which NOR circuit provides at its output circuit the signal $\overline{M2}$ in response to the satisfaction of its logical input conditions. A NOR circuit 34 is connected to be responsive to the output signals from the AND circuits 28 and 30 and provides at is output circuit the signal $\overline{M1}$. The count signals are generated from a network comprising the AND circuits 35 and 36 and the NOR circuit 37 in response to the output signals from the NAND circuits 26 and 27. The AND circuit 35 receives one input signal from the NAND circuit 26 and its other input is responsive to the signal $\overline{H2}$. In the same fashion, the AND circuit 36 receives a signal directly from the NAND circuit 27 and the H2 signal. The output signals from the AND gates 35 and 36 are utilized in combination as input signals for the NOR circuit 37. The output signal from the NOR circuit 37 is identified as the $\overline{PC}$ count signal, or negative count signal. The PC signal, or the positive count signal, is generated through an inverter circuit 38 that is connected to be responsive to the PC signal. In the same fashion, a signal M1 is generated from the signal $\overline{M1}$ through the provision of an inverter circuit coupled to receive the $\overline{M1}$ signal. With the generation of the signals $\overline{M1}$, $\overline{M2}$, PC and $\overline{PC}$ from the position detection circuit 15 there will be applied a parallel circuit relationship to both the machine element position register 17 and the rate feedback network 16.

The application of the signals from the position detection circuit 15 to the machine element position register 17 will be first described. The numerical command position is illustrated as a conventional recirculating position register 17a. In a typical control system, the register 17a may have a capacity to store 6 words or digits of 4 bits each. These digits may be designated as the digits $d_0, d_1, d_2, d_3, d_4, d_5$ with the bits of each digit defined as the bits $b_0, b_1, b_2$ and $b_3$, each instance reading from the least significant to the most significant digit or bit. This would require twenty-four bistable elements or flip-flops logically interconnected to be continually shifted from element to element in response to the application of a clock pulse thereto. The pulse derived from the output stage of the register being recirculated back as an input pulse to the first stage of the register, as is well known. With this construction, then, the output circuits of the elements or flip-flops will define a digital signal and which digital signal will be modified with the application of each count pulse to the register 17a. Preselected digital indications defining the desired rates of travel, R, I, S and C. The numerical command are stored in the register 17a in a binary coded decimal notation. The recirculating position register 17a is counted up or down by means of the control afforded by the recirculating register input control 17b. The recirculating register input control 17b is effective for entering the position signals PC or $\overline{PC}$ into the register 17a as well as the signals representative of the numerical command for defining the desired position for the element 10. These numerical commands are derived from a source of positioning commands 18 and are entered into the recirculating register control 17b. The control element 17b is essentially defined as a one-half adder circuit and assures that the data entered into the register 17a is in the binary-coded decimal notation and not in a pure binary code. This control also assures that the data entered into the register 17a is entered in at the correct interval in time relative to the words and bits circulating in the register 17a to effect the correct entry of this data. For this purpose the selection of the signal $d5b3$ assures this operation. The availability of the signal $d5b3$ assures that the next signal represents the least significant digit time, $d_0b_0$, with respect to the information circulating in the register 17a and the point in time when new information may be entered into the register 17a.

The signals R, I, S and C corresponding to the desired rate of travel are applied directly to the command rate network 19 of a more or less conventional construction and in one embodiment comprises a combination of preselected logical elements and bistable elements for defining a digital to analog converter. Any other well known digital to analog converter can be employed for this purpose. The analog signal from the network 19 will have an amplitude decreasing in accordance with the desired rate of travel, R, I, S or C. The output of the network 19 is represented by the term identified as the reference terminal. This analog output signal is applied as one of the input signals to the motor drive control circuit 21. This analog signal is applied through a dropping resistor to the input terminal $\Sigma$ for the motor drive circuit 21. The remaining input signal to the motor drive circuit 21 is the feedback signal representative of the actual rate of travel of the element 10. The motor drive circuit is essentially of conventional construction and includes a differential amplifier as the input element with the input terminal Σ as its input terminal and is connected to be responsive to the difference between the rate of travel signal and the desired rate of travel signal to effect the desired control on the servo motor 11 to cause the element 10 to travel at the commanded rate.

For the purposes of generating the actual rate of travel feedback signal, the rate feedback network 16 is coupled to be responsive to the signals provided by the position detection circuit 15, namely, the signals M1, $\overline{M1}$, $\overline{M2}$ and PC. For this purpose these four signals are processed by multivibrator means shown as a one-shot multivibrator 41 coupled to be responsive to count signals $\overline{M1}$ and $\overline{M2}$. The other pair of signals, the M1 and the PC signals are applied to a bistable element 42 which is further identified as a direction storage element 42. The direction storage element 42 is responsive to the positioning signal M1 in combination with the direction of travel of pulse PC so as to store the direction of travel in the intervals between the reception of the count pulses M1. Once the direction of travel is determined then the state of the element 42 remains the same and an output indication is provided with the reception of each M1 pulse. The one-shot multivibrator 41 is connected to be responsive to the pulse $\overline{M1}$ and $\overline{M2}$ to provide a corresponding output pulse for controlling the generation of the desired analog signal representative of the rate of travel. The pulses from the multivibrator 41 are utilized in a logical combination with the direction signals from the element 42 to control a constant current generating means. The constant current generating means comprises a positive constant current generator 43 and a negative constant current generator 44. The terms "positive" and "negative" having reference to the positive and negative counts or the directions of motion of element 10 away from and toward the desired position, respectively. The positive constant current generator 43 is controlled or triggered through a two input AND gate 45 while the negative constant current generator 44 is controlled through a two input AND gate 46. The AND gate 45 is connected to be responsive to the output signal from the multivibrator 41 in combination with a signal from the element 42 indicative of a positive direction of travel. Accordingly, when a positive direction of travel is stored in the element 42, the positive constant generator 43 will provide a positive output current in response to each pulse received from the multivibrator 41. In the same fashion, the AND circuit 46 is connected to be responsive to the signal from the element 42 when it stores a signal representative of the negative direction of travel and the pulses from the multivibrator 41. Accordingly, when the element is traveling in a negative direction, the negative constant current generator 44 will be triggered in response to each pulse generated by the multivibrator 41. It will, of course, be appreciated that the pulses for triggering the generators 43 and 44 will be provided from the multivibrator 41 in response to each triggering pulse $\overline{M1}$ and $\overline{M2}$.

At this point, it may be well to recall that the position register 17 utilized only the M1 signal rather than counting every pair of pulses provided by the transducer 12. This effectively causes every other increment that is signalled by the transducer 12 to be counted. The M2 pulse has been provided solely from a practical standpoint for the generation of the feedback signals representative of the actual rate of travel. This is employed due to the manner the analog signal is generated, as will become more apparent immediately hereinafter.

With the actuation of one of the generators 43 or 44, the output signal provided therefrom is applied to a temporary storage device shown as the storage capacitor 47. With each pulse of current from the generator 43 or 44, the capacitor 47 is charged in accordance with the polarity of the applied pulse, in either the positive or negative sense. The capacitor 47 is connected to the point common to both the generators 43 and 44 and to ground, as illustrated. The terminal of the capacitor 47 that is common to the generators 43 and 44 is connected by means of a resistor 48 in an integrating network between said common terminal and the Σ input terminal for the control circuit 21. The capacitor 47 and the resistor 48 are proportioned so as to allow the capacitor to charge in response to the pulses from the generators 43 and 44 and during the intervals between the application of these pulses to discharge through the resistor 48 to provide the feedback signal representative of the actual rate of travel to the input terminal Σ of the differential amplifier of the circuit 21. It should be appreciated that the voltage on the capacitor 47 is essentially an integration of all of the current pulses applied thereto. Through the appropriate selection of the parameters for the capacitor 47, resistor 48, the amplitude of the current pulse provided by the generators 43 and 44 and the time duration of the current pulses, the resulting feedback voltage will be in proportion to the rate of travel of the element 10.

This proportionally will be true of a range of speeds that are limited on the low speed end by the ratio of the discharge of the capacitor 47 through the resistor 48 between the pulses and the charge on the capacitor from each pulse. On the high speed end the limit is with respect to the maximum voltage allowed by the current generators 43 and 44 or the response of the one-shot multivibrator 41 to the high frequency pulse rate. Stated mathematically this relationship is as follows:

$$Vfb = \frac{I_p T_p R_{22}}{T_c}$$

wherein V$fb_2$ feedback voltage $I_p$ = pulse current
$T_p$ = pulse current time
$T_c$ = time between pulses
$R_{22}$ = value of discharge resistor 22

This applies over above range for $T_c \leq R_{22}C$ and is adequate for most applications. Lower speeds result in only a slight non-linearity of output speed vs. reference voltage.

From the above equation it should be evident that the feedback voltage, V$fb$, can be changed merely by varying the parameter $T_p$, pulse current time. This can be varied, for example, by changing the time constant for the multivibrator 41.

A detailed circuit diagram of a one-shot multivibrator that includes means for controlling the output pulse width thereof and thereby controlling the motor speed range is illustrated in FIG. 3. The one-shot multivibrator is essentially of conventional construction except for the addition of the block identified as the speed range control and which control effects a speed range on the order of 200:1. This circuit is effective for controlling the output pulse width of the multivibrator 41 by controlling the switch back pulse of the multivibrator by switching the transistor 50. The transistor 50 is switched in response to the "Rapid," R, signal from the position register 17 and thereby controls the width of the output pulse. This allows an increase in motor speed range by requiring higher speeds for a given reference voltage to achieve the necessary feedback voltage for balancing the drive system.

With the above detailed organization of the invention in mind, the detailed operation of the automatic control system can be summarized. It will be assumed that the controllable machine tool element 10 will be spaced at a distance from its desired position so that it will be moving in a direction towards its desired position or in a positive direction. It will also be assumed that the machine tool has been actuated and the servo motor 11 is in operation. Before the machine tool control proper is actuated the numerical command representative of the desired position of the element 10 is entered from the source of position commands 18 into the recirculating register 17a by means of the register input control 17b. Accordingly, with the numerical positioning command recorded in the register 17a it will be appreciated that the digital output indication therefrom effective on the command rate network 19 will be the digital signal representative of the rapid transverse rate, R. The servo motor 11 will be energized to effect a high speed rate to move the element 10 toward its desired position.

With the movement of the element 10, the incremental transducer 12 will continuously generate the incremental signals $\overline{TH1}$ and $\overline{TH2}$. The logical circuits comprising the position detection circuit 15 will be preset as a result of the zero reference signal, $\overline{TH0}$, generated from the transducer 12 and which signal is applied to the transducer zero reference circuit 25. The output from the reference circuit 25 presets the bistable elements H1 and H2. Accordingly, with the generation of the signals $\overline{TH1}$ and $\overline{TH2}$ the elements H1 and H2 will follow these input signals so that their output indications will correspond to the output signals produced from the transducer 12. It will be recalled that the logical elements J and K for the bistable elements H3 and H4 depend upon the presence of the control bit $d5b3$ for changing their states. This, of course, is representative of the beginning of the least significant digit time with respect to the input stage of the recirculating position register 17a. When he necessary number of clock pulses have advanced the digital bits in the register 17a to the point where the bit $d5b3$ occurs at the J and K circuits for the elements H3 and H4 the states of the elements H1 and H2 will be correspondingly transferred as the states of the elements H3 and H4. This, then, will produce a change in the output signals of the elements H3 and H4 as a result of the generation of an incremental position signal from the transducer 12 and which changes are processed through the logical circuits comprising the NAND, AND and NOR circuits previously described. From this combination of logical elements the position signals M1, $\overline{M1}$, $\overline{M2}$ and PC and $\overline{PC}$ are generated and appear at the output of the position detection circuit 15. These signals then are coupled to the machine element position register 17 and the rate feedback network 16.

It should be noted that the elements H1 and H2 follow the signals provided from the transducer 12 under the control of the count signal $\overline{M1}$. This signal is applied as an input signal to each of the J and K logical elements for these elements H1 and H2. This signal is applied to these logical elements to signal a change in the output from the detection circuit 15 and thereby maintains synchronization of the circuit 15 with the clock portion of the system.

The M1 count signal, then, is applied to the recirculating register input control 17b along with a signal indicative of the direction of count PC and $\overline{PC}$. Again, to assure the correct entry of the count down signal into the register 17a, the register input control 17b is responsive to the bit $d5b3$. Accordingly, at bit time $d5b3$ not only is the state of the bistable elements H1 and H2 transferred to the elements H3 and H4 but also the pulse indicative of an incremental change in the position of the element 10 is entered into the position register 17a; counted down one increment. This single incremental change will not change the effective digital signal applied to the command rate network 19. This network 19 will still command, and correspondingly provide an analog signal to, the motor drive circuit 21 for commanding a rapid rate of travel.

These same position signals from the circuit 15 also actuate the direction storage element 42 of the rate feedback network 16 whereby it signals a positive direction of travel. With the reception of the position signals $\overline{M1}$ and $\overline{M2}$ at the multivibrator 41 a pulse is provided to the AND circuit 45 in combination with the direction pulse from the element 42 to cause a current to be generated from the positive current generator 43. The output current provided by the generator 43 is effective to charge the capacitor 47. Accordingly, with each M1, $\overline{M1}$ and $\overline{M2}$ count pulse, a current signal of a preselected voltage will charge the capacitor 47 in response thereto. In one practical embodiment of the invention, a pulse is generated for each 0.00005 inch of motion of the element 10. During the intervals between the pulses $\overline{M1}$ and $\overline{M2}$, the capacitor 47 will be discharged through the resistor 48. It will be appreciated that during the interval that the rapid rate of travel is commanded that over a given increment of time the rate of charge and discharge of he capacitor 47 will be stabilized to provide a voltage at the terminal $\Sigma$ for maintaining the command rate of travel of the motor 11. It will be understood that the combination of the capacitor 47 and the resistor 48 functions to integrate the current pulses generated to provide the desired output analog signal.

This voltage condition will prevail until the position register 17a is counted down as a result of the continuous travel of the element 10 to a point wherein the digital output indications therefrom correspond to that for the intermediate, I, rate of travel. When this position is obtained the analog command signal from the network 19 is reduced and accordingly the feedback signal from the network 16 will signal a rate of travel greater than the commanded rate and produce a signal at the terminal $\Sigma$ to cause the control circuit 21 to reduce the motor speed towards the intermediate speed I. Again, the circuit will tend to stabilize until the intermediate speed I is maintained through the maintenance of a stabilized voltage on the capacitor 47, until the register 17a is counted down to the next desired rate of travel, the slow rate or S. This condition will continue and the circuit will operate in the same general fashion through the creep speed until the motor is de-energized and the element 10 arrives at the desired position.

It should now be apparent to those skilled in the art that the present invention provides an improved automatic control system for positioning an element in a machine tool system, or the like, wherein a single transducer is utilized to provide both position information and rate of travel information at a lower cost than heretofore thought possible and over a wider speed range than is practical with prior apparatus.

What is claimed is:

1. In a machine tool control system for controllably positioning a machine tool element including
   a motor coupled to a machine tool element to be positioned,
   motor control circuit means connected to control the speed of the motor and thereby the rate of travel of the machine tool element,
   a single incremental position transducer coupled to the motor for signalling preselected increments of movement of the machine tool element by means of a pair of phase displaced signals for each increment,
   and circuit means for receiving the signals from the position transducer and providing a signal representative of the actual rate of travel of the machine tool element and a signal representative of the desired rate of travel for the machine tool element and coupling the signals to the motor control circuit.

2. In a machine tool control system for controllably positioning a machine tool element including
   a machine tool drive element, a single transducer coupled to the element for signalling increments of motion of the elements, means coupled to be responsive to the transducer signals for generating signals representative of a desired rate of travel for the controlled machine tool element, and separate means coupled to be responsive to the same transducer signals for generating signals representative of the actual rate of travel of the machine tool element and control circuit means coupled to be responsive to the signals from both said means for effecting the desired rate of travel.

3. In a control circuit for use in a machine tool including
a motor coupled to drive a controllable machine tool element, a position transducer coupled to the motor to be driven in unison with the machine tool element and providing signals representative of the actual position of the controlled machine tool element, position detection circuit means coupled to be responsive to the position signals for providing signals to program the controlled machine tool element for a rate of travel in accordance with its actual position,
circuit means coupled to be responsive to the position signals for providing signals representative of the actual rate of travel of the controlled machine element, and motor control circuit means coupled to be responsive to the signals from said latter mentioned circuit means for energizing the motor to cause said machine element to travel at the programmed rate.

4. In a control circuit as defined in claim 3 wherein the position detection circuit means includes a position register for digitally storing the desired position of the controlled machine tool element and providing digital signals therefrom, conversion circuit means coupled to the position register for converting the digital signals to an analog representative of the desired rate of travel for application to the motor control means, and circuit means for coupling the transducer signals to the position register to cause the output signals to be changed in accordance with the incremental changes in position of the machine element.

5. In a control circuit as defined in claim 4 wherein said position detection circuit means includes circuit means connected to be responsive to the signals from the position transducer for defining the position signals, and constant current generator means coupled to be responsive to the thus defined position signals for producing currents representative of the actual rate of travel of the controlled element for application to the motor control circuit means.

6. In a control circuit as defined in claim 5 including a temporary storage device coupled to temporarily store the currents from said generator means in response to the application of the position signals thereto and to release said current to the motor control circuit means during the intervals between the application of the position signals.

7. In a control circuit as defined in claim 6 including means for controlling the current derived from said generator means.

8. In a control circuit for use in a machine tool including
a motor coupled to drive a controllable machine tool element, a position transducer coupled to the motor to be driven in unison with the machine element and providing signals for each increment of travel of the machine element, position detection circuit means coupled to be responsive to said transducer signals and providing digital counting and direction signals therefrom,
a rate of travel feedback network including
constant current generator means coupled to be responsive to the signals from the position detection circuit means for producing currents in response thereto representative of the actual rate of travel of the controlled element,
motor control circuit means coupled to said motor for controlling the rate of travel of the controlled element,
temporary storage means coupled intermediate said generator and motor control circuit means for temporarily storing the current pulses from the generator and to release the stored energy to the motor circuit means during the intervals between the application of the signals thereto,
and circuit means coupled to be responsive to the signals from said position detection circuit means for providing signals to the motor control circuit means representative of a desired rate of travel for the controlled element.

9. In a control circuit as defined in claim 8 including means coupled to said current generator means for controlling the pulses therefrom for effecting the desired speed range.

10. In a control circuit as defined in claim 8 wherein said rate of travel feedback network includes a one-shot multivibrator for controlling the energization of the current generator means.

11. In a control circuit as defined in claim 10 wherein the multivibrator includes means for controlling the width of output pulse derived therefrom.

12. In a control circuit as defined in claim 8 wherein the temporary storage device comprises a capacitor.

13. In a control circuit as defined in claim 12 wherein said constant current generator means comprises a pair of current generators coupled to the capacitor for charging it in accordance with the direction and actual rate of travel of the machine element.

14. In a control circuit for use in a machine tool including
a motor coupled to drive a controllable machine tool element,
an incremental position transducer coupled to the motor to be driven in unison with the controlled machine element for providing signals representative of each increment of travel of the machine element,
position detection circuit means connected to be responsive to the signals from said transducer for signalling an increment of travel of said machine element and the direction of travel,
register circuit means for storing a numerical signal representative of the desired position of the machine element under control and providing a corresponding numerical output signal,
said register circuit means being coupled to the position detection circuit means and responsive to the signals therefrom whereby its output signal is representative of any travel of the controlled machine element,
a digital to analog converting network coupled to be responsive to the output signals from said register circuit means and providing an analog output signal representative of a desired rate of travel for the machine element towards the desired position, said network being responsive to preselected numerical signals representative of different positions of the machine element for causing the output analog signal to effect different rates of travel as the machine element approaches the desired position in response to the signals from said register circuit means,
a rate feedback network coupled to the output signals from said detection circuit means for providing an analog signal representative of the actual rate of travel of the machine element,
motor control circuit means coupled to be responsive to said analog signals and to said motor for controlling the rate of travel of the machine element in accordance with said signals.

15. In a control circuit as defined in claim 14 including a source of numerical positioning commands adapted to be coupled to said register circuit means for entry therein and said motor control circuit means includes a differential amplifier responsive to said analog signals.

16. In a control circuit as defined in claim 15 wherein said position transducer provides a pair of phase displaced signals and said position detection circuits provide a corresponding pair of signals and a pair of signals indicative of the direction of travel of the machine element and the rate feedback network includes constant current generating means coupled to be responsive thereto.

17. In a control circuit as defined in claim 16 wherein said rate feedback network includes a multivibrator means responsive to the position signals, a storage element responsive to the direction signals, and circuit means coupled intermediate said constant current generating means and the multivibrator means and the storage element for controlling the current pulses from said generator means.

18. In a control circuit as defined in claim 17 wherein said current generating means comprises a positive and negative current generator energizable in accordance with the direction of movement and a temporary storage device coupled to said current generators to store the currents received therefrom and to the differential amplifier.

19. In a control circuit as defined in claim 18 wherein the temporary storage device is a capacitor proportioned to store the currents received from said generator means upon application of the position signals thereto and to discharge during the intervals between the position signals to provide a rate of travel signal to the differential amplifier.

20. In a control circuit as defined in claim 19 wherein the multivibrator means is a one-shot multivibrator and includes means for controlling the widths of the output pulses therefrom.

References Cited
UNITED STATES PATENTS

| | | | |
|---|---|---|---|
| 3,379,944 | 4/1968 | Nuttall et al. | 318—162 XR |
| 3,414,787 | 12/1968 | Reuteler et al. | 318—162 XR |
| 3,418,547 | 12/1968 | Dudler | 318—28 XR |
| 3,414,785 | 9/1963 | Orahood et al. | 318—162 XR |

BENJAMIN DOBECK, Primary Examiner

U.S. Cl. X.R.

318—28